(12) United States Patent
Kurakawa et al.

(10) Patent No.: US 8,939,242 B2
(45) Date of Patent: Jan. 27, 2015

(54) ELECTRICALLY DRIVEN VEHICLE

(71) Applicant: Honda Motor Co., Ltd., Tokyo (JP)

(72) Inventors: Yukinori Kurakawa, Wako (JP); Koji Aoki, Wako (JP); Seiji Kato, Wako (JP); Masaru Nakayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/019,543

(22) Filed: Sep. 6, 2013

(65) Prior Publication Data

US 2014/0124277 A1 May 8, 2014

(30) Foreign Application Priority Data

Nov. 8, 2012 (JP) ................................. 2012-246004

(51) Int. Cl.
  *B60K 1/00* (2006.01)
  *B60K 1/04* (2006.01)
  *H01M 2/10* (2006.01)

(52) U.S. Cl.
  CPC ............... *B60K 1/04* (2013.01); *H01M 2/1083* (2013.01); *Y02T 10/7005* (2013.01); *B60K 2001/0422* (2013.01); *B60K 2001/0427* (2013.01); *B60K 2001/0433* (2013.01)
  USPC ..................................... 180/65.1; 180/65.31

(58) Field of Classification Search
  CPC ................................. B60R 16/04; B60R 16/02
  USPC ..................... 180/68.5, 65.1, 65.31
  See application file for complete search history.

(56) References Cited

U.S. PATENT DOCUMENTS

| | | | | |
|---|---|---|---|---|
| 6,227,322 B1 * | 5/2001 | Nishikawa | .................... | 180/68.5 |
| 6,811,197 B1 * | 11/2004 | Grabowski et al. | .......... | 180/68.5 |
| 6,902,020 B2 * | 6/2005 | Kronner et al. | .............. | 180/68.5 |
| 6,978,855 B2 * | 12/2005 | Kubota et al. | ................ | 180/68.5 |
| 7,048,321 B2 * | 5/2006 | Bandoh et al. | ............... | 180/68.5 |
| 7,240,752 B2 * | 7/2007 | Takahashi et al. | ........... | 180/68.1 |
| 7,810,596 B2 * | 10/2010 | Tsuchiya | ..................... | 180/68.5 |
| 7,823,672 B2 * | 11/2010 | Watanabe et al. | ............ | 180/68.5 |
| 7,896,115 B2 * | 3/2011 | Ono et al. | .................. | 180/65.31 |
| 7,900,728 B2 * | 3/2011 | Suzuki et al. | ............... | 180/68.5 |
| 8,042,637 B2 * | 10/2011 | Nagata et al. | ................ | 180/68.5 |
| 8,079,435 B2 * | 12/2011 | Takasaki et al. | ............. | 180/68.5 |
| 8,297,387 B2 * | 10/2012 | Kadoi et al. | ................. | 180/68.5 |
| 8,469,129 B2 * | 6/2013 | Mildner et al. | .............. | 180/68.5 |
| 2001/0030069 A1 * | 10/2001 | Misu et al. | ................... | 180/68.1 |
| 2008/0047767 A1 * | 2/2008 | Tsuchiya | ..................... | 180/68.5 |
| 2009/0183935 A1 * | 7/2009 | Tsuchiya | ..................... | 180/68.5 |
| 2010/0231035 A1 * | 9/2010 | Tsuchiya et al. | .............. | 307/9.1 |
| 2011/0297467 A1 * | 12/2011 | Iwasa et al. | .................. | 180/68.5 |
| 2013/0140101 A1 * | 6/2013 | Lim et al. | .................... | 180/68.5 |

FOREIGN PATENT DOCUMENTS

JP    07-156826    6/1995

* cited by examiner

*Primary Examiner* — Hau Phan
(74) *Attorney, Agent, or Firm* — Mori & Ward, LLP

(57) ABSTRACT

An electrically driven vehicle includes a driver's seat, a left rear seat, a right rear seat, a center console, a first battery group, and a second battery group. The left rear seat and the right rear seat are provided side by side in a rear of the driver's seat. The center console is arranged between the left rear seat and the right rear seat and extends backwardly from the driver's seat. The first battery group includes batteries arranged under the driver's seat. The second battery group includes batteries arranged under the center console and under the left rear seat and the right rear seat in the rear of the driver's seat.

7 Claims, 9 Drawing Sheets

ELECTRICALLY DRIVEN VEHICLE

CROSS-REFERENCE TO RELATED APPLICATIONS

The present application claims priority under 35 U.S.C. §119 to Japanese Patent Application No. 2012-246004, filed Nov. 8, 2012. The contents of this application are incorporated herein by reference in their entirety.

BACKGROUND OF THE INVENTION

1. Technical Field

The present invention relates to an electrically driven vehicle.

2. Background Art

An electrically driven vehicle which is of the type having a plurality of batteries arranged in the wide area under left and right front seats and left and right rear seats provided side by side in pairs is already known in Japanese patent laid-open publication No. H07-156826, for example.

SUMMARY OF THE INVENTION

According to one aspect of the present invention, an electrically driven vehicle includes a driver's seat, a left rear seat, a right rear seat, a center console, a first battery group, and a second battery group. The left rear seat and the right rear seat are provided side by side in a rear of the driver's seat. The center console is arranged between the left rear seat and the right rear seat and extends backwardly from the driver's seat. The first battery group includes batteries arranged under the driver's seat. The second battery group includes batteries arranged under the center console and under the left rear seat and the right rear seat in the rear of the driver's seat.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
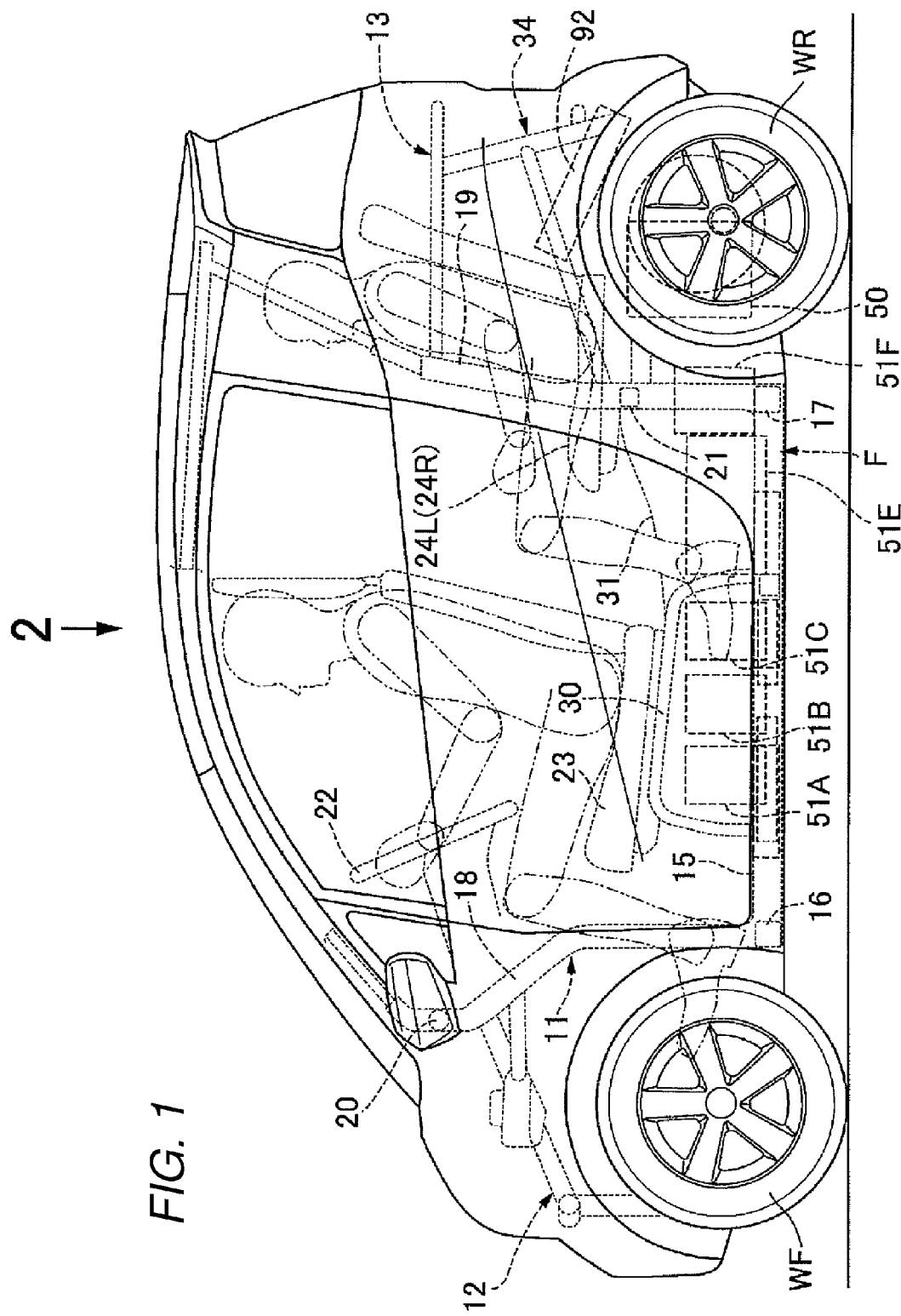
FIG. 1 is a side view of an electrically driven vehicle.

The embodiments will now be described with reference to the accompanying drawings, wherein like reference numerals designate corresponding or identical elements throughout the various drawings.

In the following description, the orientation such as front, rear, left, right, upper and lower is set on the basis of a rider riding on an electrically driven vehicle.

Figure 2:
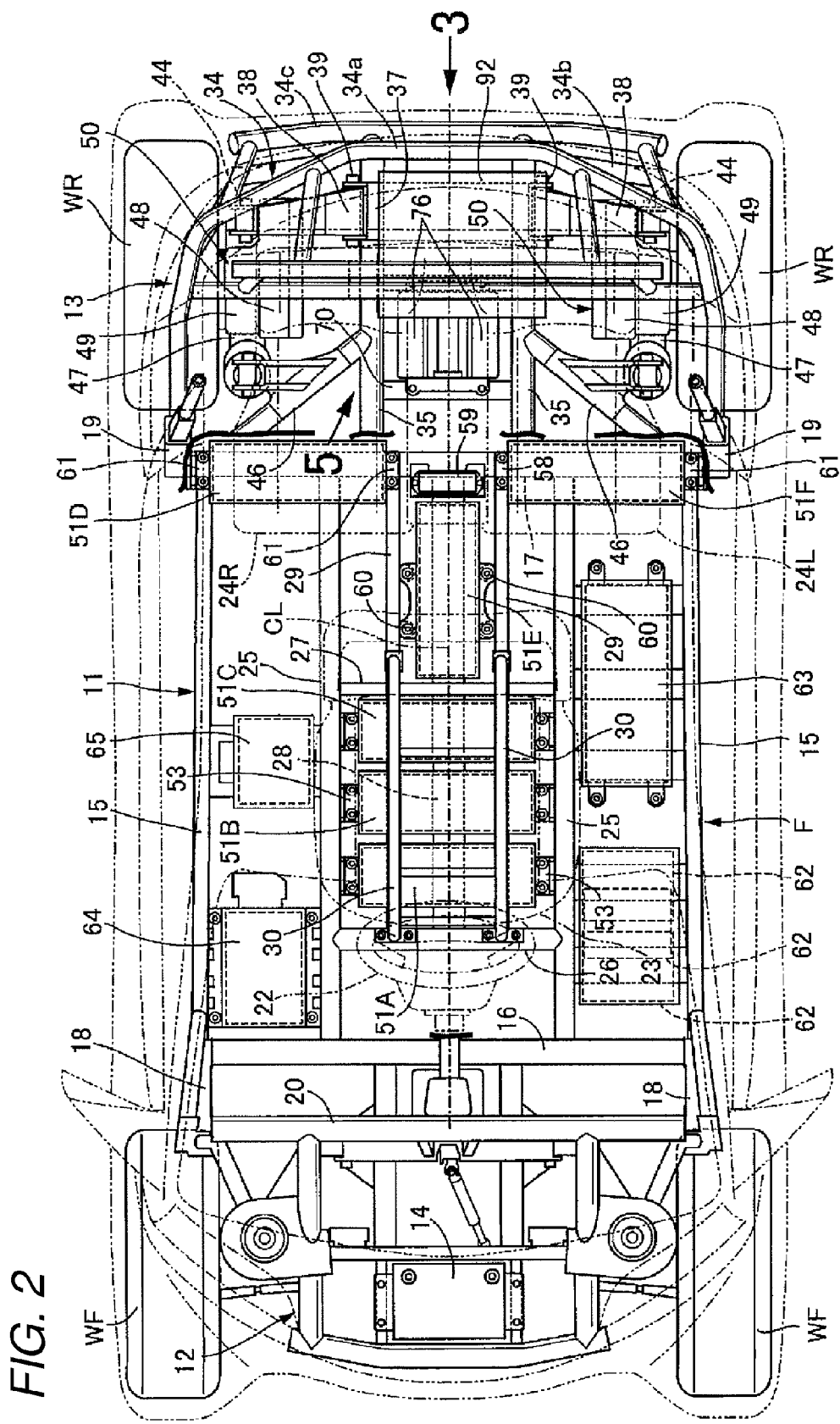
FIG. 2 is a view of a vehicle body frame provided with electrical equipment, viewed from the direction of an arrow 2 of FIG. 1.

Referring first to FIGS. 1 and 2, from a front portion of an electrically driven four-wheeled vehicle as an electrically driven vehicle there are suspended a pair of left and right front wheels WF, WF, and from a rear portion of a vehicle body frame F there are suspended a pair of rear wheels WR, WR.

The vehicle body frame F includes a cabin structure section 11, a front frame 12 connected to a front part of the cabin structure section 11 such as to allow the pair of left and right front wheels WF, WF to be suspended therefrom, and a rear frame 13 connected to a rear part of the cabin structure section 11 such as to allow the pair of left and right rear wheels WR, WR to be suspended therefrom. On the front frame 12 there is mounted a battery 14 for accessories for supplying electric power to the accessories provided on the electrically driven vehicle.

The cabin structure section 11 includes a pair of left and right side sills 15, 15 extending in a forward and backward direction, a front cross frame 16 connecting front portions of the side sills 15, 15, a rear cross frame 17 connecting rear portions of the side sills 15, 15, a pair of left and right front upper frames 18, 18 extending upwardly from the front portions of the side sills 15, 15, a pair of left and right rear upper frames 19, 19 extending upwardly from the rear portions of the side sills 15, 15, a front upper cross frame 20 connecting upper portions of the pair of left and right front upper frames 18, 18, and a rear upper cross frame 21 connecting intermediate portions of the pair of left and right rear upper frames 19, 19.

In a cabin the contour of which is defined by the cabin structure section 11, a driver's seat 23 is arranged at the rear of a steering wheel 22 for steering the front wheels WF, WF and located on a center line CL of the vehicle body which extends forwardly and backwardly along the center of the vehicle body in the vehicle width direction. A pair of left and right rear seats 24L, 24R provided side by side are arranged at the rear of the driver's seat 23.

Between the front cross frame 16 and the rear cross frame 17 there are provided center sub-frames 25, 25 each of which extends in a forward and backward direction on both sides of the center line CL of the vehicle body so as to establish a connection between intermediate portions of the cross frames 16, 17. Front and rear sub-cross frames 26, 27 are provided between the center sub-frames 25, 25 in such a manner as to be spaced apart in the forward and backward direction. A battery support plate 28 arranged on the center line CL of the vehicle body is provided to establish a connection between the front cross frame 16 and the rear cross frame 17. In addition, a pair of left and right battery support frames 29, 29 are arrange on each side of the battery support plate 28 so as to extend in the forward and backward direction. These battery support frames 29, 29 are located between the rear sub-cross frame 27 and the rear cross frame 17.

A pair of left and right seat frames 30, 30 are arranged above the center sub-frames 25, 25 and formed in an upwardly rising configuration. The pair of left and right seat frames 30, 30 extend between front portions of the pair of left and right battery support frames 29, 29 and the front sub-cross frame 26. The driver's seat 23 is carried on the seat frames 30, 30.

Further, the pair of left and right rear seats 24L, 24R are supported by the rear upper cross frame 21 which establishes a connection between the intermediate portions of the rear upper frames 19, 19. A center console 31 is arranged between these rear seats 24L, 24R and extends backwardly from the driver's seat 23 to cover the battery support frames 29 and 29 from above.

Figure 3:
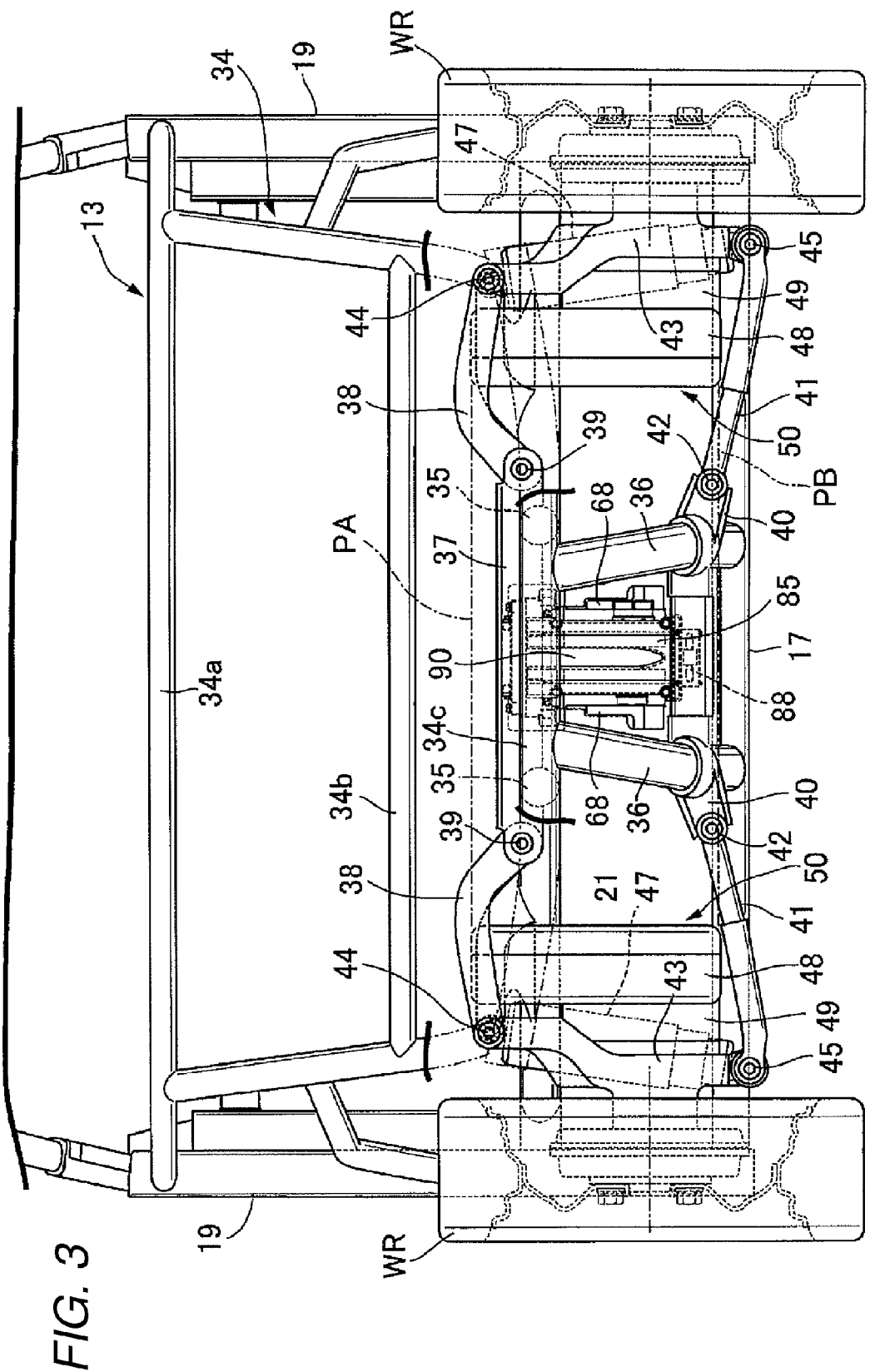
FIG. 3 is a view taken in the direction of an arrow 3 of FIG. 2.

Referring to FIG. 3 together, the rear frame 13 includes a cage frame 34 which defines a contour of the rear part of the vehicle body and which has an upper frame section 34a formed in a backwardly curved shape and connected to upper portions of the rear upper frames 19, 19, an intermediate frame section 34b extending in the vehicle width direction under a rear end of the upper frame section 34a, and a lower frame section 34c extending in the vehicle width direction under the intermediate frame section 34b, a pair of left and right rear upper sub-frames 35, 35 extending backwardly from the rear upper cross frame 21 so as to be connected at the rear end thereof to the lower frame section 34c of the cage frame 34, a pair of left and right rear lower sub-frames 36, 36 extending backwardly and upwardly from the rear cross frame 17 so as to be connected at the rear end thereof to the lower frame section 34c, and a rear wheel support frame 37 which is provided between the pair of left and right rear upper sub-frames 35, 35 and extends in the left and right direction.

On each end of the rear wheel support frame 37, inner end portions of a pair of leftward and rightward extending left and right upper suspension arms 38, 38 are supported through pins 39, 39 in an upwardly and downwardly swingable fashion. On brackets 40, 40 each provided on the rear portions of the pair of left and right rear lower sub-frames 36, 36, inner end portions of a pair of leftward and rightward extending left and right lower suspension arms 41, 41 are supported through pins 42, 42 in an upwardly downwardly swingable fashion. Moreover, upper portions of knuckles 43, 43 for having the rear wheel WR pivotally supported thereon are connected through pins 44, 44 to outer end portions of the upper suspension arms 40, 40, while lower portions of the knuckles 43, 43 are connected through pins 45, 45 to outer end portions of the lower suspension arms 41, 41. In addition, a pair of left and right cushion support frames 46, 46 are provided between the intermediate portions of the rear upper sub-frames 35, 35 and the rear upper cross frame 21. On the pair of left and right cushion support frames 46, 46, there are supported upper end portions of a pair of upwardly and downwardly extending left and right rear cushions 47, 47. Lower end portions of these rear cushions 47, 47 are connected to the pair of left and right knuckles 43, 43.

The pair of left and right rear wheels WR, WR are driven by power created by electric motors 48, 48 separately provided for these rear wheels WR, WR. Driving units 50, 50 constructed by having the electric motors 48, 48 attached to reduction gear casings 49, 49 which house reduction gears for reducing the rotational power from the electric motors 48, 48 thereby to transmit the same to the rear wheels WR, WR, are mounted on the knuckles 43, 43.

Referring again to FIG. 2, this electrically driven vehicle is equipped with a plurality of batteries in order to supply the electric power to the pair of left and right electric motors 48, 48. The electrically driven vehicle of this embodiment is a small-sized one, and it is not required that the distance capable of traveling on a single charge is equal to the distance that the normal four-wheeled electrically driven vehicle capable of being equipped with a large amount of batteries is able to travel on a single charge. Therefore, a capacity of batteries to be loaded, namely, the number of batteries is comparatively small, and small space is enough for the arrangement of these batteries. Accordingly, six batteries of from first to sixth batteries 51A, 51B, 51C, 51D, 51E, 51F are loaded into the electrically driven vehicle in such a manner as to be connected in series. Each of the batteries 51A~51F is formed in the shape of a rectangular parallelepiped having a rectangular cross section.

Figure 4:
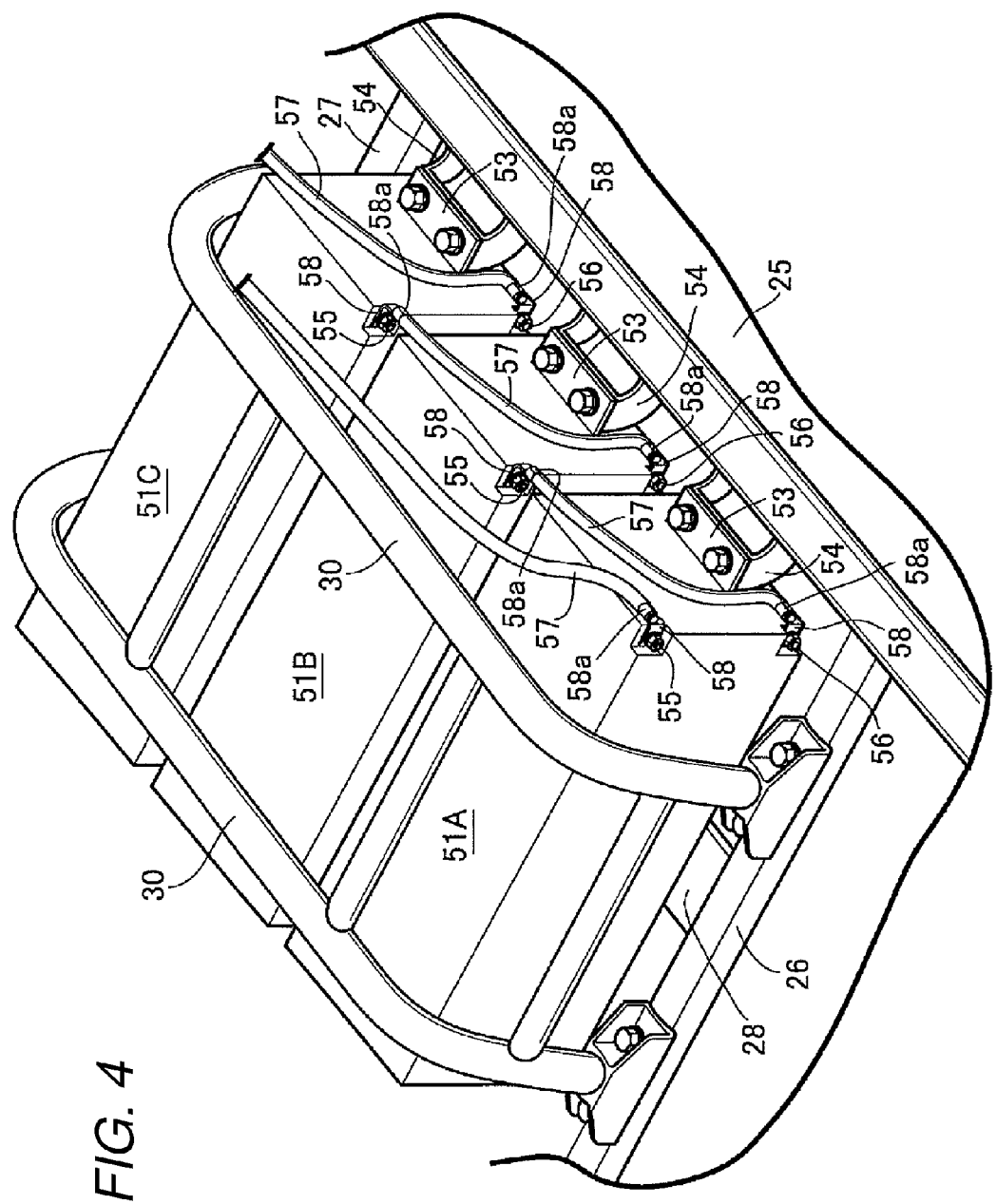
FIG. 4 is a perspective view of batteries arranged under a driver's seat.
Figure 5:
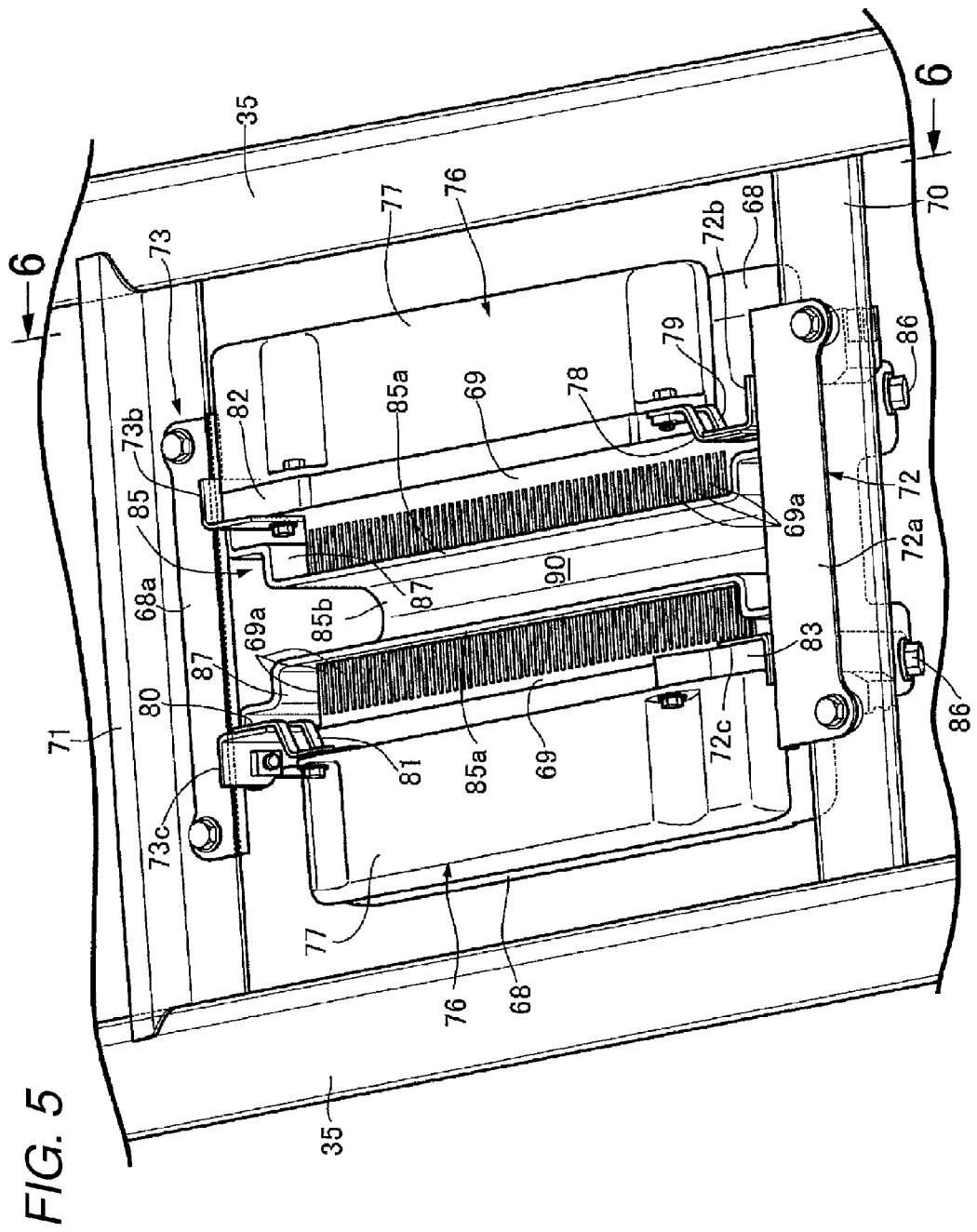
FIG. 5 is a view of a power drive unit and a heat sink, viewed from the direction of an arrow 5 of FIG. 2.
Figure 6:
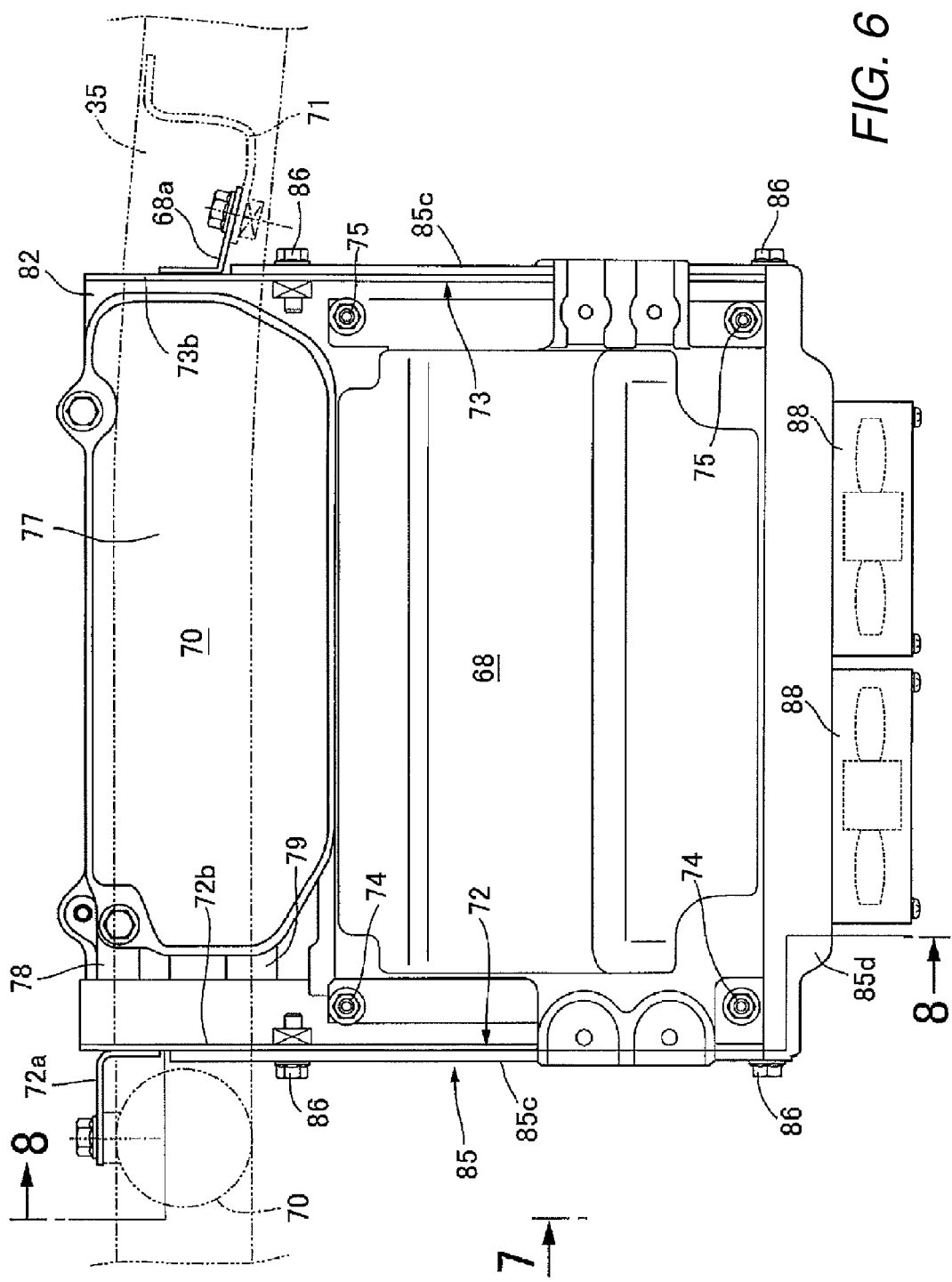
FIG. 6 is a view taken in the direction of arrows along line 6-6 of FIG. 5.
Figure 7:
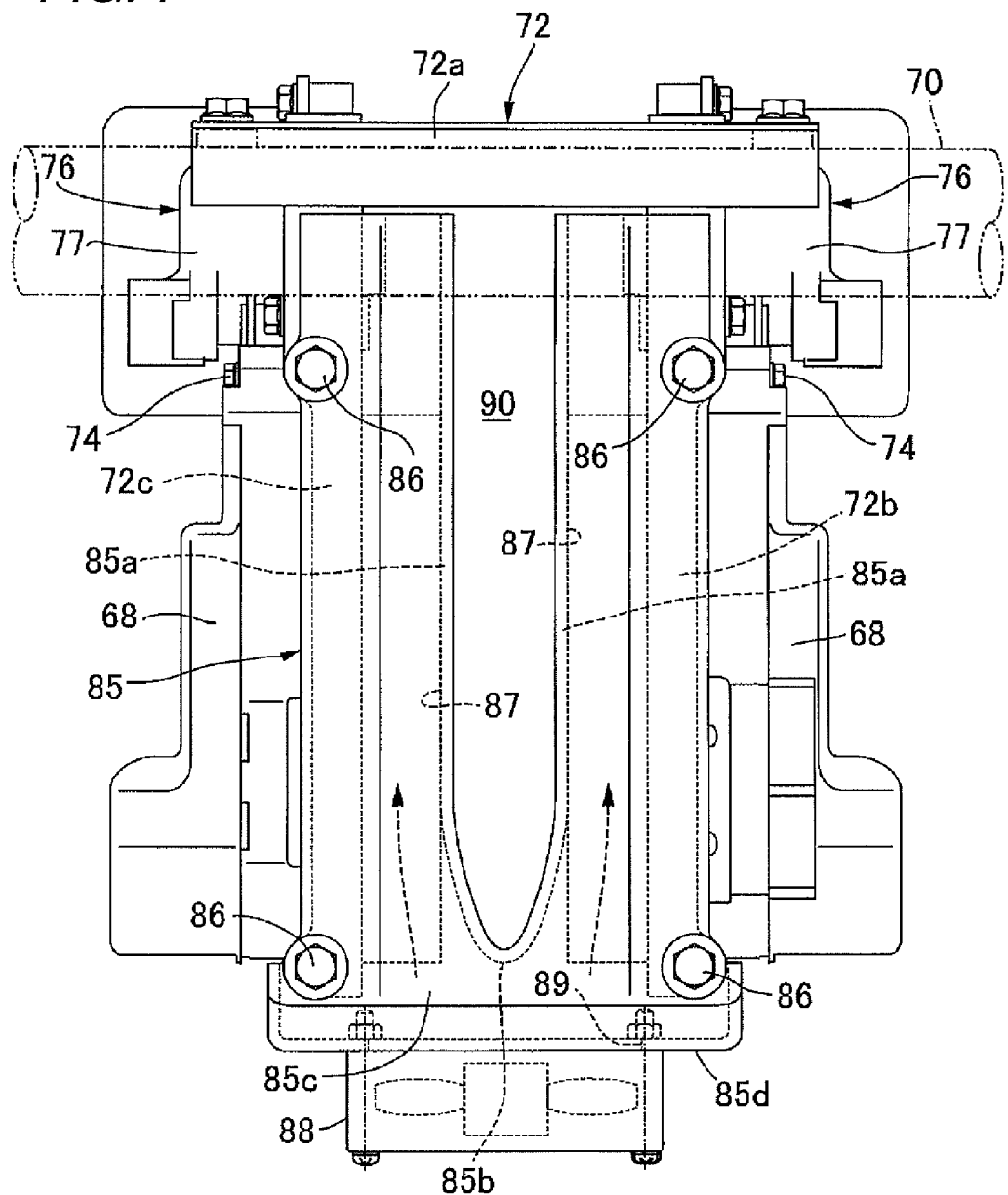
FIG. 7 is a view taken in the direction of an arrow 7 of FIG. 6.
Figure 8:
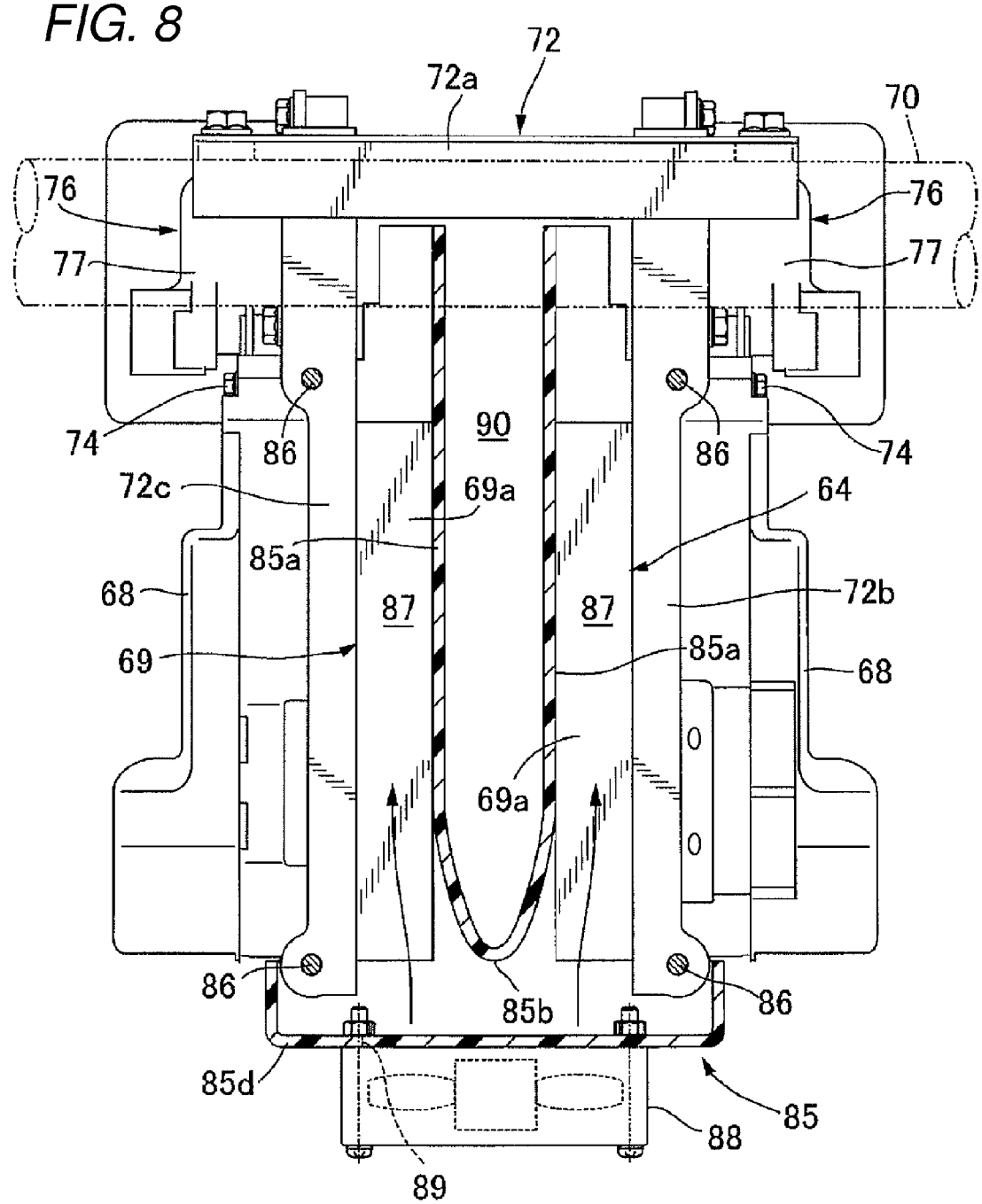
FIG. 8 is a cross sectional view taken along line 8-8 of FIG. 6.

Referring to FIG. 4 together, the first to third batteries 51A~51C among the first to sixth batteries 51A~51F are arranged and aligned under the driver's seat 23 one behind another in a forward and backward direction such that longitudinal directions thereof extend in the vehicle width direction. Also, the first to third batteries 51A~51C are arranged between the pair of left and right center sub-frames 25, 25 such as to place the central portion in the longitudinal direction thereof on the battery support plate 28. Support plates 53, 53 . . . provided on both ends in the longitudinal direction of each of the batteries 51A~51C are fastened to stays 54, 54 . . . provided on the center sub-frames 25, 25 in the corresponding relationship to the first to third batteries 51A~51C.

Further, positive side terminals 55, 55, 55 and negative side terminals 56, 56, 56 are provided in one end in the longitudinal direction of each of the first to third batteries 51A~51C on an upper portion and a lower portion of each front surface of these batteries. Connecting terminals 58, 58 . . . to which conducting wires 57, 57 . . . are attached respectively are electrically connected to the positive side terminals 55, 55, 55 and the negative side terminals 56, 56, 56 respectively. Each of the connecting terminals 58, 58 . . . is configured to have a conducting wire connecting portion 58a, 58a . . . which projects in the lateral direction of each of the batteries 51A~51C. The conducting wire connecting portions 58a, 58a . . . is formed in a circular shape to allow the ends of the conducting wires 57, 57 to be attached thereto such that ends of each of the conducting wires 57, 57 . . . are inserted into and caulked with the conducting wire connecting portions 58a, 58a . . . .

Further, the fourth to sixth batteries 51D~51F among the first to sixth batteries 51A~51F excluding the first to third batteries 51A~51C located under the driver's seat 23 are arranged only under the center console 31 and under the pair of left and right rear seats 24L, 24R at the rear of the driver's seat 23 such that the fifth and sixth batteries 51E, 51F are connected in this order in series with the fourth battery 51D which is connected in series with the third battery 51C. The fourth battery 51D is arranged under the right side rear seat 24R in such a manner that the longitudinal direction thereof extends in the vehicle width direction. The fifth battery 51E is arranged under the center console 31 in such a manner that the longitudinal direction thereof extends in the forward and backward direction. The sixth battery 51F is arranged under the left side rear seat 24L in such a manner that the longitudinal direction thereof extends in the vehicle width direction. In addition, between both of the rear seats 24L, 24R, there is placed a service plug 59 which is interposed midway in a circuit connecting the third and fourth batteries 51C, 51D.

The fifth battery 51E is arranged between the pair of left and right battery support frames 29, 29 such as to be placed on the battery support plate 28. Support plates 60, 60 provided on each of left and right lower sides of the fifth battery 51E are fastened to stays (not shown) which are arranged in pairs on the battery support frames 29, 29 while leaving a space in the forward and backward direction.

The fourth and sixth batteries 51D, 51F arranged each under the pair of left and right rear seats 24L, 24R are located between the rear cross frame 17 and the rear upper cross frame 21 so as to be mounted on the rear cross frame 17 with the longitudinal directions thereof extending along the rear cross frame 17.

Moreover, support plates 61, 61 provided on both ends in the longitudinal direction of each of the fourth and sixth batteries 51D, 51F are fastened to stays (not shown) provided on the rear cross frame 17.

By the way, although the driver's seat 23 is arranged on the center line CL of the vehicle body, three DC-DC converters 62, 62, 62 and a main contactor 63 as high voltage electrical equipment are arranged on one side (left side in this embodiment) of left and right sides of the center line CL of the vehicle body, while an ECU 64 for controlling the vehicle and an ECU 65 for controlling the motor, as low voltage electrical equipment, are arranged on the other (right side in this embodiment) of the left and right sides of the center line CL of the vehicle body.

By the way, the reason why these three DC-DC converters 62 are employed is because in the case of a single DC-DC converter 62, the efficiency is decreased in a region where output power is low. Therefore, in order to improve the efficiency, the three DC-DC converters 62 . . . are connected in parallel and the number to be used is varied in proportion to the load.

Referring to FIGS. 5 through 8 together, a pair of power drive units 68, 68 corresponding individually to the pair of electric motors 48, 48 are arranged in parallel in a plan view between the pair of rear upper sub-frames 35, 35 of the rear frame 13 and, as shown in FIG. 3, located between a horizontal plane PA passing through upper ends of the pair of driving units 50, 50 and a horizontal plane PB passing through lower ends of the driving units 50, 50.

On lateral surfaces of mutually opposed sides of the power drive units 68, 68, there are separately mounted heat sinks 69, 69 each of which has a plurality of cooling fins 69a, 69a, 69a . . . extending in parallel in the direction orthogonal to the direction of parallel arrangement of the power drive units 68, 68, namely, in the upper and lower direction in this embodiment.

A front support frame 70 and a rear support frame 71 are positioned on either side of the power drive units 68, 68 and between the pair of rear upper sub-frames 35, 35 in a plan view. A front supporting mount 72 is attached to the front support frame 70, while a rear supporting mount 73 is attached to the rear support frame 71.

The front supporting mount 72 includes a front horizontal frame 72a which extends in the vehicle width direction to be fastened to the front support frame 70, and a pair of downwardly extending left and right front vertical frames 72b, 72c which are attached to the front horizontal frame 72a at two positions spaced apart in the vehicle width direction. The rear support mount 73 includes a rear horizontal frame 73a which extends in the vehicle width direction to be fastened to the rear support frame 71, and a pair of downwardly extending left and right rear vertical frames 73b, 73c which are attached to the rear horizontal frame 73a at two positions spaced apart in the vehicle width direction. The front horizontal frame 72a, the front vertical frames 72b, 72c, the rear horizontal frame 73c and the rear vertical frames 73b, 73c are made of shape steel of an L-shaped cross section.

The front lateral walls of the pair of left and right power drive units 68, 68 are fastened through bolts 74, 74 to an upper portion and a lower portion of the pair of the left and right front vertical frames 72b, 72c provided on the front support mount 72, while the rear lateral walls of the pair of left and right power drive units 68, 68 are fastened through bolts 75, 75 to an upper portion and a lower portion of the pair of the left and right rear vertical frames 73b, 73c provided on the front support mount 73.

Further, current sensors 76, 76 are arranged above the power drive units 68, 68, respectively. A front portion of a casing 77 of the left side current sensor 76 is fastened to a pair of upper and lower support stays 78, 79 which are located on an upper part of the left side front vertical frame 72b provided on the front support mount 72. A rear portion of a casing 77 of the right side current sensor 76 is fastened to a pair of upper and lower support stays 80, 81 which are located on an upper part of the right side rear vertical frame 73c provided on the rear support mount 73.

In addition, a rear portion of the casing 77 of the left side current sensor 76 is fastened to a support stay 82 which is located on an upper part of the left side rear vertical frame 73b provided on the rear support mount 73. A front portion of the casing 77 of the right side current sensor 76 is fastened to a support stay 83 which is located on an upper part of the right side rear vertical frame 72c provided on the front support mount 72.

To the front vertical frames 72b, 72c of the front support mount 72 and to the rear vertical frames 73b, 73c of the rear support mount 73, there is fastened a baffle member 85 which closes the space between the pair of parallelly extending power drive units 68, 68 at both ends in the parallelly extending direction of these power drive units 68, 68.

Figure 9:
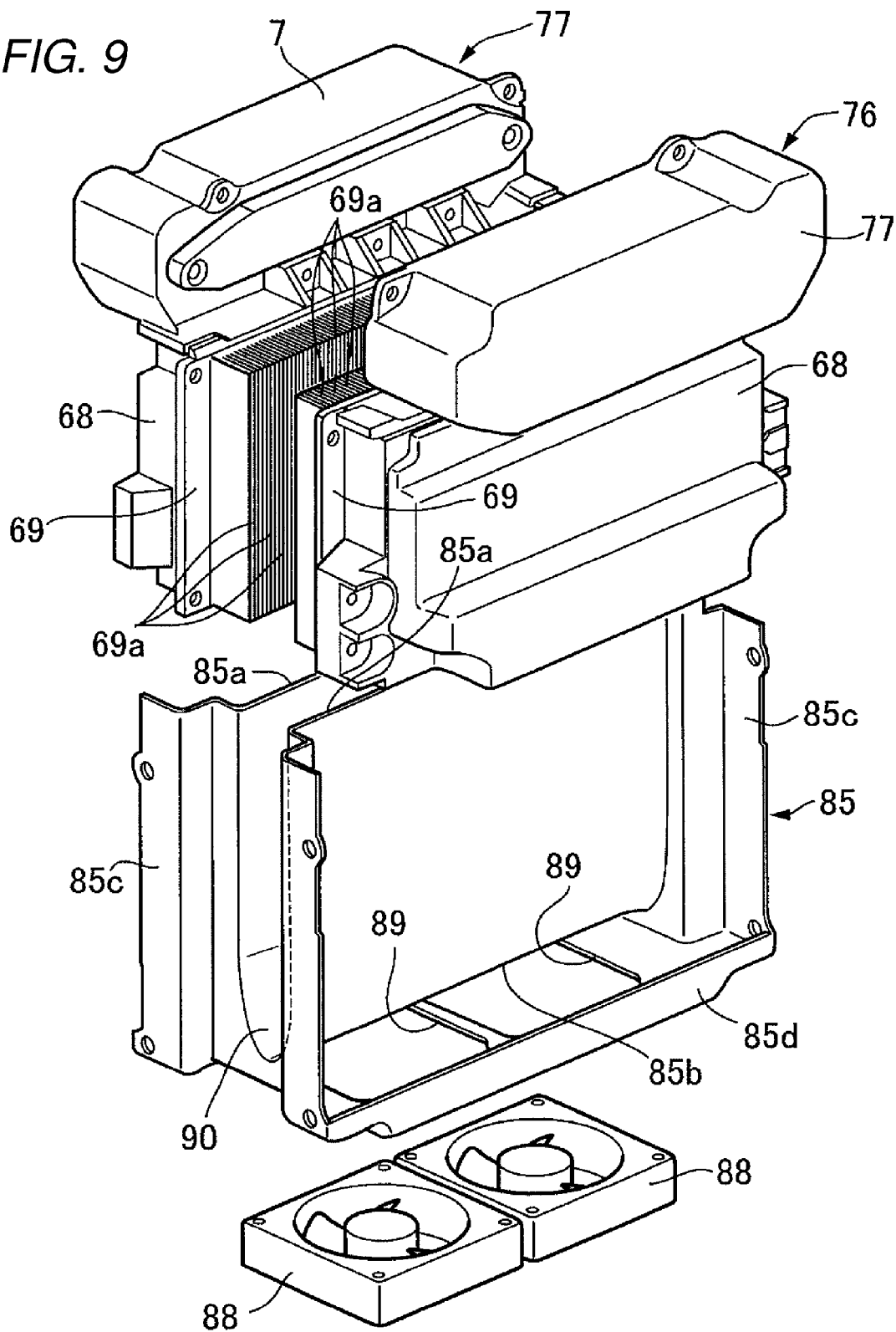
FIG. 9 is an exploded perspective view of the power drive unit to which the heat sink and an electric current sensor are attached, a baffle member and a cooling fan.

Referring to FIG. 9 together, the baffle member 85 is made of synthetic resin and integrally provided with a pair of partition wall sections 85a, 85a which are arranged between the heat sinks 69, 69 attached to the power drive units 68, 68 and lower portions of which are connected to each other, a lower connecting section 85b having a substantially upwardly opened U-shaped cross section so as to connect the lower portions of the partition wall sections 85a, 85a, a pair of front and rear end wall sections 85c, 85c which are connected at right angles to the partition wall sections 85a, 85a and to the lower connecting section 85b at both ends in the parallelly extending direction of the power drive units 68, 68, and a bottom wall section 85d arranged under the lower connecting section 85b to connect lower end portions of the end wall sections 85c, 85c. The end wall sections 85c, 85c are fastened through bolts 86, 86 to the front vertical frames 72b, 72c of the front support mount 72 and the rear vertical frames 73b, 73c of the rear support mount 73.

Between the partition wall sections 85a, 85a of the baffle member 85 and the power drive units 68, 68 there are formed a pair of air guide passages 87, 87 through which cooling air flows in the extending direction of each of the cooling fins 69a, 69a provided on the pair of heat sinks 69, 69, namely, in the upward and downward direction in this embodiment and in which the heat sinks 69, 69 are housed individually.

Further, a pair of front and rear cooling fans 88, 88 for sending the cooling air into the air guide passages 87, 87 from each one end thereof are mounted on the baffle member 85. In this embodiment, since the cooling fins 69a, 69a of the heat sinks 69, 69 within the air guide passages 87, 87 extend in parallel in the upward and downward direction, the cooling fans 88, 88 are mounted on the bottom wall section 85d of the baffle member 85 in such a manner as to let the cooling air flow in the upward direction. Openings 89, 89 are formed corresponding individually to each of the cooling fans 88, 88.

Moreover, between the partition wall sections 85a, 85a of the baffle member 85 there is formed an air passage 90 which is separated from the air guide passage 87, 87 provided between the partition wall sections 85a, 85a and the power drive units 68, 68. A front end and a rear end of the air passage 90 are opened to the center portions in the vehicle width direction of the end wall sections 85c, 85c so as to allow the traveling air to flow therethrough.

Further, on the rear frame 13 there is supported a battery charger 92 for charging the first to sixth batteries 51A~51F from an external power source. The battery charger 92 is located above the current sensors 76, 76.

Next, the operation of this embodiment will be described. Although the first to sixth batteries 51A~51F are loaded onto the electrically driven vehicle provided with the driver's seat 23 and the pair of left and right rear seats 24L, 24R arranged side by side behind the driver's seat 23, the first to third batteries 51A, 51B, 51C among the first to sixth batteries 51A~51F are arranged under the driver's seat 23, and the fourth to sixth batteries 51D~51F as the remaining batteries are arranged only under the center console 31 which extends backwardly from the drier's seat 23 and is located between the pair of left and right rear seats 24L, 24R, and under the pair of left and right rear seats 24L, 24R in the rear of the driver's seat 23. Accordingly, the floor surface forwardly of each of the rear seats 24L, 24R does not rise due to the arrangement of the fourth to sixth batteries 51D, 51E, 51F, so that the footrest of the passengers sitting in the rear seats 24L, 24R is prevented from being heightened due to the arrangement of the fourth to sixth batteries 51D, 51E, 51F and it is possible to ensure the cabin space.

Further, the vehicle body frame F includes the pair of left and right side sills 15, 15, the front and rear cross frames 16, 17 connecting the front portions and the rear portions of the side sills 15, 15 respectively, the pair of left and right rear upper frames 19, 19 extending upwardly from the rear portions of the side sills 15, 15, and the rear upper cross frame 21 connecting the intermediate portions of the rear upper frames 19, 19 so as to support the pair of left and right rear seats 24L, 24R. Moreover, the fourth and sixth batteries 51D, 51F each arranged under the rear seats 24L, 24R are located between the rear cross frame 17 and the rear upper cross frame 21. Therefore, the fourth and sixth batteries 51D, 51F under the rear seats 24L, 24R can be located in such a position as not to exert an influence on the cabin space. In addition, since the rear upper cross frame 21 and the rear cross frame 17 each of which is a rigid body are arranged above and below the fourth and sixth batteries 51D, 51F, it is possible to protect the fourth and sixth batteries 51D, 51F.

The first to third batteries 51A, 51B, 51C are arranged under the driver's seat 23 one behind another in the forward and backward direction, and the connecting terminals 58 ... which have the conducting wire connecting portions 58a ... projecting in the lateral direction of each of these batteries 51A~51C are electrically connected to the terminals 51, 51 ... of the batteries 51A~51C. In addition, the ends of the conducting wires 57 ... are attached to the conducting wire connecting portions 58a ... at the lateral sides of the first to third batteries 51A~51C. Therefore, the conducting wire connecting portions 58a ... are able to be oriented to any direction desired to extend the conducting wires 57 ... , whereby to establish electrical connections between the first to third batteries 51A~51C without causing protrusion by bending the conducting wires 57 ... at the lateral sides of the first to third batteries 51A~51C aligned in the forward and backward direction.

Further, the driver's seat 23 is arranged on the center line CL of the vehicle body which passes through the vehicle center in the vehicle width direction to extend in the forward and backward direction. The DC-DC converter 62, 62, 62 and the main contactor 63 as the high voltage electrical equipment are arranged on one side (left side in this embodiment) of the left and right sides of the vehicle body center line CL while the ECU 64 for controlling the vehicle and the ECU 65 for controlling the motor, as the low voltage electrical equipment, are arranged on the other (right side in this embodiment) of the left and right sides of the vehicle body center line CL. Therefore, the effective wiring with good space efficiency can be provided.

Further, the pair of power drive units 68, 68 corresponding individually to the pair of electric motors 48, 48 which generate the power for driving the left and right rear wheels WR, WR are arranged in parallel between the rear wheels WR, WR. On the lateral surfaces of the mutually opposed sides of the power drive units 68, 68, there are separately mounted the heat sinks 69, 69 each of which has the plurality of cooling fins 69a, 69a ... extending in parallel in the direction orthogonal to the parallelly extending direction of the power drive units 68, 68. In addition, between the pair of power drive units 68, 68 and the partition wall sections 85a, 85a integrally formed on the baffle member 85 which closes the space between the power drive units 68, 68 at both ends in the parallelly extending direction, there are formed the pair of air guide passages 87, 87 which house the heat sinks 69, 69 separately in such a manner as to allow the cooling air to flow in the extending direction of each of the cooling fins 69a, 69a .... Therefore, the cooling air is allowed to flow toward the each of the heat sinks 69, 69 whereby to carry out the assured cooling, and the pair of air guide passages 87, 87 can be formed between the power drive units 68, 68 by a single baffle member 85 with good space efficiency. Moreover, since the partition wall sections 85a, 85a are located between the pair of air guide passages 87, 87, it is possible to restrain the thermal influence from one of the heat sinks 69, 69 from operating on the other.

Further, since the cooling fans 88, 88 for sending the cooling air into the air guide passages 87, 87 from each one end thereof are mounted on the baffle member 85, each of the heat sinks 69, 69 can be more effectively cooled due to forced cooling by the cooling fans 88, 88.

In addition, since the pair of partition wall sections 85a, 85a are integrally formed on the baffle member 85 in such a manner that the air passage 90 being independent of the pair of air guide passages 87, 87 is formed between the pair of partition wall sections 85a, 85a, it is possible to cool the partition wall sections 85a, 85a with the air flowing through the air passage 90, and the mutual thermal influence between the heat sinks 69, 69 can be more effectively restrained.

Further, since the cooling fans 88, 88 are mounted on the lower end of the baffle member 85 such that the cooling air flows upwardly within the pair of air guide passages 87, 87 which house separately the pair of heat sinks 69, 69 having the plurality of cooling fins 69a, 69a extending in parallel in the upward and downward direction, the cooling air sent from the cooling fans 88, 88 flows upwardly within the pair of air guide passages 87, 87 which house the pair of heat sinks 69, 69 separately, so that, in cooperation with the heated air circulating upwardly by convection, the cooling air from the cooling fans 88, 88 can be more effectively circulated within the air guide passages 87, 87 whereby to carry out more effective cooling.

Further, the vehicle body frame F is provided with the cabin structure section 11, and the pair of left and right rear upper sub-frames 35, 35. The upper suspension arms 38, 38 which extend laterally outwardly to have the rear wheels WR, WR suspended therefrom are swingably supported on each end of the rear wheel support frame 37 which is fixedly secured to the pair of rear upper sub-frames 35, 35 so as to extend in the vehicle width direction. Moreover, the pair of power drive units 68, 68 are arranged between the pair of rear upper sub-frames 35, 35 in plan view. Accordingly, by the construction that the heat sinks 69, 69 are attached individually to each of the lateral surfaces of the mutually opposed sides respectively, the pair of power drive units 68, 68 can be compactly arranged in the region corresponding to the narrow space in the vehicle width direction between the rear upper sub-frames 35, 35.

Furthermore, the pair of drive units 50, 50 including the electric motors 48, 48 respectively are supported on the knuckles 43, 43 for pivotally supporting the rear wheels WR, WR, and the pair of power drive units 68, 68 are arranged between the horizontal planes PA, PB which extend through the upper ends and the lower ends of the drive units 50, 50. Therefore, the pair of power drive units 68, 68 can be more compactly arranged.

While the embodiment of the present invention has been described, it is to be understood that the present invention is not limited to the above described embodiment, and that various changes and modifications in design may be made without departing from the scope of the present invention delineated by the following claims.

According to a first aspect of the embodiment, there is provided an electrically driven vehicle which has a driver's seat and a pair of left and right rear seats provided side by side in the rear of the driver's seat and which is equipped with a plurality of batteries, comprises a center console being arranged between the pair of left and right rear seats and extending backwardly from the driver's seat, some batteries of the plurality of batteries being arranged under the driver's seat, and the rest of the batteries being arranged under the center console and under the pair of left and right rear seats in the rear of the driver's seat.

According to a second aspect of the embodiment, in addition to the first aspect, there is provided a vehicle body frame including a pair of left and right side sills, front and rear cross frames connecting front portions and rear portions of the side sills respectively, a pair of left and right rear upper frames extending upwardly from the rear portions of the side sills, and a rear upper cross frame connecting intermediate portions of each of the rear upper frames so as to support the pair of left and right rear seats, wherein the batteries each arranged under the pair of rear seats are located between the rear cross frame and the rear upper cross frame.

According to a third aspect of the embodiment, in addition to the second aspect, the batteries arranged under the rear seats are formed in the shape of a rectangular parallelepiped a longitudinal direction of which extends along the rear cross frame.

According to a fourth aspect of the embodiment, in addition to any of the first through third aspects, the plurality of batteries are arranged under the driver's seat one behind another in a forward and backward direction, wherein connecting terminals having conducting wire connecting portions which project in the lateral direction of each of these batteries are electrically connected to terminals of these batteries, and ends of conducting wires are attached to the conducting wire connecting portions at the lateral sides of the batteries.

According to a fifth aspect of the embodiment, in addition to any of the first through fourth aspects, the driver's seat is arranged on a center line of the vehicle body which passes through a center of the vehicle in a vehicle width direction and extends in the forward and backward direction, wherein high voltage electrical equipment is arranged on one side of left and right sides of the center line of the vehicle body and low voltage electrical equipment is arranged on the other of the left and right sides of the center line of the vehicle body.

According to the first aspect of the embodiment, since the batteries excluding the batteries arranged under the driver's seat are arranged under the center console and under the pair of left and right rear seats in the rear of the driver's seat, the floor surface forwardly of each of the rear seats does not rise due to the arrangement of the batteries, so that the footrest of the passengers sitting in the rear seats is prevented from being heightened due to the arrangement of the batteries and it is possible to ensure the cabin space.

According to the second aspect of the embodiment, the front and rear cross frames connect the front portions of the side sills and the rear portions of the side sills respectively, and the rear upper cross frame connects the intermediate portions of the pair of left and right rear upper frames which extend upwardly from the rear portions of the side sills, so as to support the pair of left and right rear seats. Moreover, the batteries each arranged under the rear seats are located between the rear cross frame and the rear upper cross frame. Therefore, the batteries under the rear seats can be located in such a position as not to exert an influence on the cabin space. In addition, since the rear upper cross frame and the rear cross frame each of which is a rigid body are arranged above and below the batteries, it is possible to protect the batteries.

According to the third aspect of the embodiment, since the longitudinal direction of each of the batteries which are formed in a rectangular parallelepiped and arranged under the rear seats extends along the rear cross frame, the protrusion of the batteries into the cabin space can be prevented.

According to the fourth aspect of the embodiment, the connecting terminals which are electrically connected to the terminals of the plurality of batteries arranged under the driver's seat one behind another in the forward and backward direction have the conducting wire connecting portions projecting in the lateral direction of each of these batteries, and the ends of the conducting wires are attached to the conducting wire connecting portions at the lateral sides of the batteries. Therefore, the conducting wire connecting portions can be oriented to any direction necessary to extend the conducting wires, whereby to establish electrical connections between the batteries without causing the protrusion by bending the conducting wires at the lateral sides of the plurality of batteries.

According to the fifth aspect of the embodiment, since the high voltage electrical equipment is arranged on one side of the left and right sides of the forwardly and backwardly extending center line of the vehicle body while the low voltage electrical equipment is arranged on the other of the left and right sides of the center line of the vehicle body, the effective wiring with good space efficiency can be provided.

Obviously, numerous modifications and variations of the present invention are possible in light of the above teachings. It is therefore to be understood that within the scope of the appended claims, the invention may be practiced otherwise than as specifically described herein.

What is claimed is:

1. An electrically driven vehicle comprising:
a driver's seat;
a left rear seat;
a right rear seat, the left rear seat and the right rear seat being provided side by side in a rear of the driver's seat;
a center console arranged between the left rear seat and the right rear seat and extending backwardly from the driver's seat;
a first battery group including batteries arranged under the driver's seat; and
a second battery group including batteries arranged under the center console and under the left rear seat and the right rear seat in the rear of the driver's seat, wherein the driver's seat is arranged on a center line of a vehicle body which passes through a center of the electrically driven vehicle in a vehicle width direction of the electrically driven vehicle and which extends in a forward and backward direction of the electrically driven vehicle, and wherein the batteries of the first battery group are arranged on the center line of the vehicle body under the driver's seat.

2. The electrically driven vehicle according to claim 1, further comprising:
a vehicle body frame comprising:
a left side sill having a left front portion and a left rear portion;
a right side sill having a right front portion and a right rear portion;
a front cross frame connecting the left front portion and the right front portion;
a rear cross frame connecting the left rear portion and the right rear portion;
a left rear upper frame extending upwardly from the left rear portion of the left side sill;
a right rear upper frame extending upwardly from the right rear portion of the right side sill; and
a rear upper cross frame connecting a left intermediate portion of the left rear upper frame and a right intermediate portion of the right rear upper frame so as to support the left rear seat and the right rear seat, the batteries of the second battery group arranged under the left rear seat and the right rear seat being located between the rear cross frame and the rear upper cross frame.

3. The electrically driven vehicle according to claim 2, wherein the batteries of the second battery group arranged under the left rear seat and the right rear seat has a rectangular parallelepiped shape having a longitudinal direction extending along the rear cross frame.

4. The electrically driven vehicle according to claim 2, wherein the left side sill and the right side sill extend in a forward and backward direction of the electrically driven vehicle, and
wherein the front cross frame, the rear cross frame, and the rear upper cross frame extend in a vehicle width direction of the electrically driven vehicle.

5. The electrically driven vehicle according to claim 2, wherein the rear upper cross frame is provided above the rear cross frame.

6. The electrically driven vehicle according to claim 1, wherein the batteries of the first battery group are arranged under the driver's seat one behind another in a forward and backward direction of the electrically driven vehicle,
wherein connecting terminals having conducting wire connecting portions which project in a lateral direction of each of the batteries of the first battery group are electrically connected to terminals of the batteries of the first battery group, and
wherein ends of conducting wires are attached to the conducting wire connecting portions at lateral sides of the batteries of the first battery group, respectively.

7. The electrically driven vehicle according to claim 1, wherein a high voltage electrical equipment is arranged on one of a left side and a right side with respect to the center line of the vehicle body, and
wherein a low voltage electrical equipment is arranged on another of the left side and the right side with respect to the center line of the vehicle body.

* * * * *